April 22, 1930.   O. E. CLARK   1,755,240
LUBRICATOR
Filed March 15, 1923   2 Sheets-Sheet 1

Inventor
Omar E. Clark

Attorney

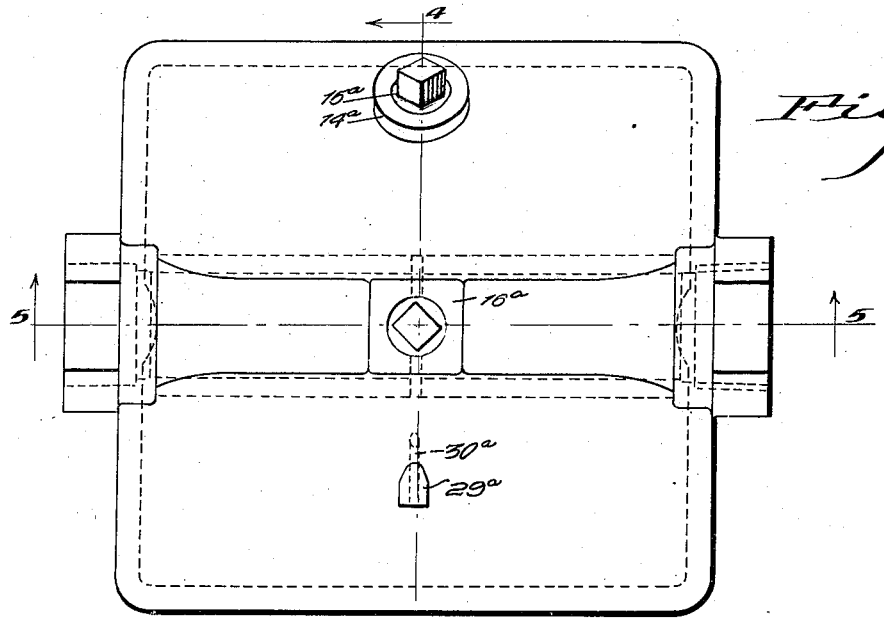
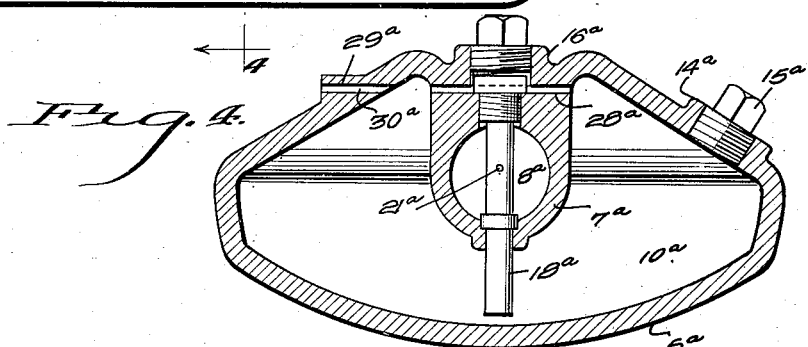
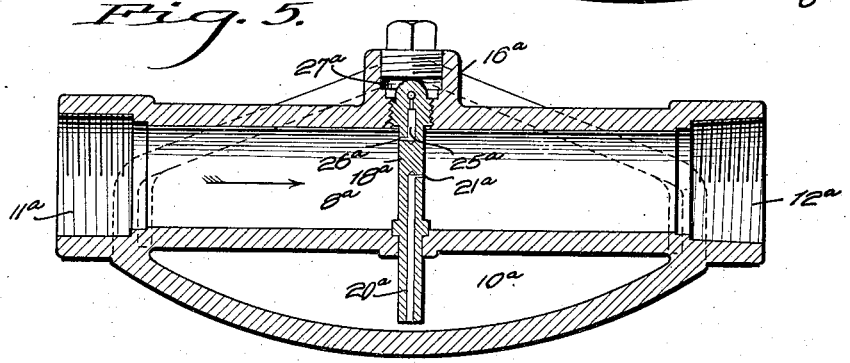

Patented Apr. 22, 1930

1,755,240

UNITED STATES PATENT OFFICE

OMAR E. CLARK, OF DENVER, COLORADO, ASSIGNOR, BY MESNE ASSIGNMENTS, TO THE GARDNER-DENVER COMPANY, OF QUINCY, ILLINOIS, A CORPORATION OF DELAWARE

LUBRICATOR

Application filed March 15, 1923. Serial No. 625,352.

The present invention relates to lubricators, and particularly those employed in the supply lines or manifolds of the machines to be lubricated, as for example, air-operated rock drills.

The primary object is to provide a simple structure of a novel character that will deliver oil in a sufficient quantity into the air stream, while the pressure is on the hose or conduit, and will promptly stop the delivery upon the reduction of the pressure, as for example, when the supply of air is cut off.

In the accompanying drawings, two embodiments of the invention are illustrated:

Figure 3 is a plan view of another embodiment,

Figure 4 is a cross sectional view on the line 4—4 of Figure 3,

Figure 5 is the longitudinal sectional view on the line 5—5 of Figure 3.

Figure 1:
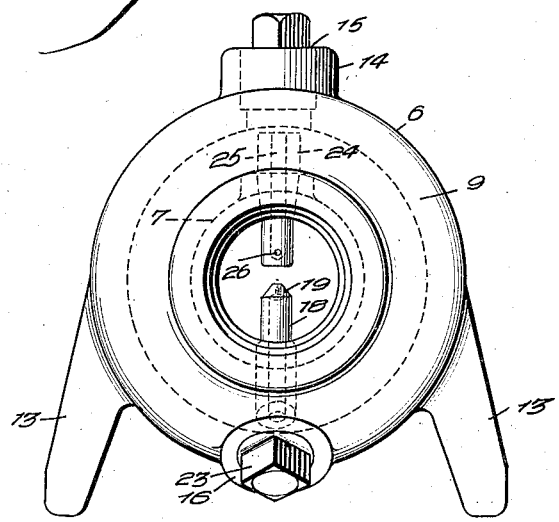
Figure 1 is an end elevation of one form of construction.
Figure 2:
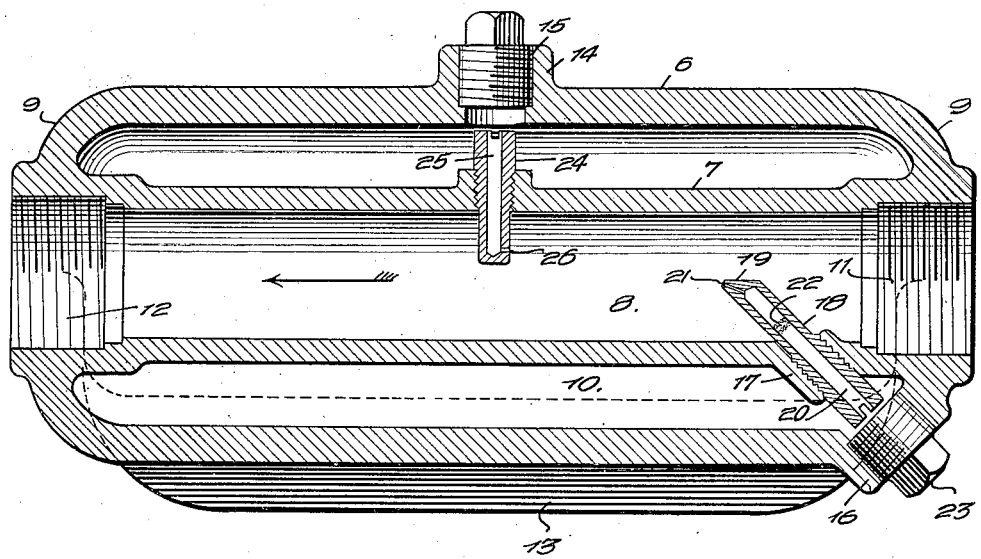
Figure 2 is a longitudinal sectional view therethrough.

In the embodiment disclosed in Figures 1 and 2, a casing is employed that is generally cylindrical in form, and comprises an outer tubular wall 6 and an internal conduit 7, providing an open-ended passageway 8. The walls 6 and 7 are connected at their ends by end walls 9, thereby forming a lubricant reservoir 10 between the walls and around the passageway 8. The conduit 7 at one end is preferably threaded, as shown at 11, to receive the coupling of a hose or other pipe, and constitutes the inlet end of the passageway 8. The opposite end is also internally threaded, as shown at 12 for the reception of a coupling and is the outlet end of said passageway, as indicated by the arrow in Figure 2. Preferably the outer wall 6 is provided with spaced depending longitudinal flanges 13 which act as supports or legs for the lubricator. A filling nipple 14 on the top of the casing affords access to the reservoir 10, and detachably threaded thereinto is a closure plug 15.

The bottom of the reservoir 10 is provided at one end with a diagonally disposed nipple 16 having access to an internal nipple 17 in line therewith, and into said nipple 17 is threaded a stem 18 that is inclined inwardly toward the outlet end 12 of the passageway and said stem projects into said passageway and terminates in a nozzle 19. A conduit 20, opening through the lower end of the stem, terminates at its upper end in a port 21 that opens through the nozzle 19 and faces in the direction of the outlet end 12 of the passageway. A screen 22 may be placed in the conduit 20. The outer nipple 16 is closed by a detachable plug 23. Another stem 24 is threaded transversely through the conduit 7 in line with the opening through the nipple 14, and is provided with a longitudinal bore 25 opening through its upper end, but terminating short of its lower end, said lower end of the stem projecting into the passageway 8. A transverse port 26 in communication with the lower end of the bore 25 opens into the passageway 8, but faces the inlet end 11 of said passageway.

In operation, assuming the reservoir 10 partially filled with oil, if air under pressure is passed through the passageway 8, a portion of this air will find its way through the port 26 and bore 25, thereby creating pressure upon the oil and causing a small stream to be projected through the port 21 into the air stream. This pressure in the reservoir 10 will be slightly in excess of the pressure of the air stream by reason of the fact that the port 26 faces said air stream while the port 21 opens in the direction of the air stream, and it has been found that the difference is sufficient to insure the expulsion of the oil from the bottom of the reservoir. As soon as the air is cut off and pressure is reduced in the passageway 8, the pressure in the reservoir will be correspondingly reduced and thus the outflow of oil into the passageway automatically stops.

In Figures 3, 4 and 5, a still different form of construction is disclosed, providing a relatively large reservoir the subject matter of which is covered in a divisional application which has matured into Patent 1,666,959 of April 24, 1928. An outer casing 6ª is illustrated, through which extends a conduit 7ª for the passage of air or other motive fluid, the passageway being illustrated at 8ª. Said passageway has an inlet nipple 11ª and an outlet nipple 12ª. The reservoir formed is shown at 10ª and has a filling nipple 14ª at one side closed by a plug 15ª. A central nipple 16ª affords access for the introduction of a double stem 18ª that is threaded into the upper portion of the conduit 7ª, and extends across said conduit into the lower end of the reservoir 10ª. This conduit has a bore 20ª in its lower portion that is in communication with the passageway 8ª through a port 21ª that opens in the direction of the outlet nipple 12ª of said passageway. The upper end of this stem 18ª has a conduit 25ª provided at its lower end with a transverse port 26ª that opens into the passageway 8ª towards the inlet nipple 11ª. The passageway 25ª furthermore has a transverse port 27ª at its upper end which port is in communication with transverse ports 28ª that open into the upper portion of the reservoir. The ports 28ª are preferably formed by drilling a transverse hole through the upper end of the conduit 7ª, this port being made possible by drilling through the side of the casing 6ª, as shown at 29ª in Figure 4 and the hole 29ª being closed by a plug 30ª.

Obviously the operation of this structure is precisely the same as that of the first embodiment.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:—

1. A lubricator, comprising a casing having a fluid passageway therethrough and a lubricant reservoir, means for permitting the flow of lubricant from the reservoir into the passageway, and means for creating pressure in the reservoir, comprising a stem extending between the passageway and reservoir and having a conduit opening into the latter, said stem having a portion extending into the fluid passageway and the said conduit having an inlet port opening into the passageway in opposition to the flow of fluid through said passageway.

2. A lubricator, comprising a casing having a fluid passageway therethrough and a lubricant reservoir surrounding the passageway and walled therefrom, means for permitting the outflow of lubricant from the lower portion of the reservoir into the passageway, and means for creating pressure in the reservoir comprising a stem extending into the upper portion thereof and having a portion extending into the fluid passageway, said stem having therein a conduit provided with an offset inlet port, opening into the passageway in opposition to the flow of fluid through said passageway.

3. A lubricator, comprising a casing having a fluid passageway therethrough and a lubricant reservoir, a lubricant conduit extending from the lower portion of the reservoir below the wall of the passageway into the passageway and having an outlet port in the passageway faced in one direction, and a pressure conduit extending from the passageway into the upper portion of the reservoir above the wall of said passageway and having an inlet port in the passageway faced oppositely to the port of the lubricant conduit.

4. A lubricator, comprising a casing having a fluid passageway extending therethrough and a lubricant reservoir surrounding the passageway and walled therefrom, a stem extending from the lower portion of the reservoir upwardly through the bottom of the passageway and having a conduit with an outlet port in the passageway directed toward the outlet thereof, and a stem extending from the top of the reservoir into the passageway and having a conduit with an inlet port facing the inlet end of said passageway.

5. A lubricator comprising a casing having a fluid passageway therethrough and a lubricant reservoir walled from the passageway, and an inclined lubricant delivery stem extending from the outer portion of the reservoir through the separating wall into the fluid passageway and having a terminal nozzle in said passageway in the direction of the flow of the fluid through the passageway.

6. A lubricator comprising a casing having a fluid passageway therethrough and a lubricant reservoir walled from the passageway, an inclined lubricant delivery stem extending from the outer portion of the reservoir, through the separating wall into the fluid passageway and having a terminal nozzle in said passageway in the direction of the flow of the fluid through the passageway, and a pressure stem in the separating wall having an inlet port in the passageway in opposition to the flow of fluid and an outlet port in the outer portion of the reservoir.

7. A lubricator comprising a casing constituting a lubricant reservoir and a fluid passageway through the casing and including a wall spaced from a portion of the casing wall, a stem detachable mounted in the said wall and having a portion extending into the passageway, said stem having therein a passageway opening through its outer end into the reservoir and having an offset port opening into the fluid passageway, said casing wall having an opening affording access to the stem, and a detachable closure for the passageway.

8. A lubricator comprising a casing constituting a lubricant reservoir and a fluid passageway through the casing and including a bottom wall spaced from the casing wall, said spaced walls having alined openings, a stem insertible through the opening in the casing wall and engaged in the opening in the passageway wall, said stem projecting beyond opposite sides of the passageway wall into the lower portion of the lubricant reservoir and into the passageway and having an open conduit that opens into the reservoir and into the passageway, and a closure for the opening of the casing wall.

9. A lubricator comprising a casing constituting a lubricant reservoir and a fluid passageway through the casing and including a wall spaced from the top casing wall and forming the bottom wall of the fluid passageway, said spaced walls having alined openings, a stem insertible through the opening in the casing wall and having an externally threaded portion engaged in the opening in the passageway wall, said stem projecting beyond opposite sides of the passageway wall into the lower portion of the lubricant reservoir and into the passageway and having an open conduit that opens into the reservoir and into the passageway, the outer end of the stem having a screw driver-engaging slot accessible through the opening of the casing wall, and a closure for the opening of the casing wall.

10. A lubricator comprising a casing constituting a lubricant reservoir and a fluid passageway through the casing and including a lower wall spaced from the casing and provided with an opening, said casing having an opening alined with the opening in the passageway wall, a stem insertible through the casing opening and engaged in the opening of the passageway wall, said stem having its upper end projecting into the passageway and its lower end depending into the reservoir and being furthermore provided with an open lubricant conduit opening through said ends, and a closure for the casing opening.

In testimony whereof, I affix my signature.

OMAR E. CLARK.